United States Patent
Robinson et al.

(10) Patent No.: US 10,839,562 B2
(45) Date of Patent: Nov. 17, 2020

(54) METHODS AND SYSTEMS FOR ENABLING OBJECT ATTRIBUTE DRIVEN SUPER RESOLUTION ENCODING

(71) Applicant: Xerox Corporation, Norwalk, CT (US)

(72) Inventors: David C. Robinson, Penfield, NY (US); Arindam Das, West Bengal (IN)

(73) Assignee: Xerox Corporation, Norwalk, CT (US)

( * ) Notice: Subject to any disclaimer, the term of this patent is extended or adjusted under 35 U.S.C. 154(b) by 220 days.

(21) Appl. No.: 15/945,252

(22) Filed: Apr. 4, 2018

(65) Prior Publication Data

US 2019/0311498 A1    Oct. 10, 2019

(51) Int. Cl.
*G06T 3/40* (2006.01)
*G06T 7/60* (2017.01)
*G06T 9/00* (2006.01)
*H04N 1/411* (2006.01)

(52) U.S. Cl.
CPC .............. *G06T 9/00* (2013.01); *G06T 3/4053* (2013.01); *G06T 7/60* (2013.01); *H04N 1/4115* (2013.01)

(58) Field of Classification Search
CPC ........... G06T 3/4053; G06T 7/60; G06T 9/00; H04N 1/4092; H04N 1/4105; H04N 1/4115
See application file for complete search history.

(56) References Cited

U.S. PATENT DOCUMENTS

| | | | |
|---|---|---|---|
| 4,992,954 A * | 2/1991 | Takeda | G06K 15/02 341/65 |
| 6,259,738 B1 * | 7/2001 | Yamaguchi | G06T 9/20 375/240.21 |
| 7,636,480 B2 | 12/2009 | Zhang et al. | |
| RE41,458 E * | 7/2010 | Jo | G11B 20/10527 382/246 |
| 8,189,237 B2 | 5/2012 | McElvain | |
| 9,066,112 B2 | 6/2015 | Lin et al. | |
| 2009/0080000 A1 * | 3/2009 | Kashibuchi | H04N 1/393 358/1.2 |
| 2014/0036316 A1 * | 2/2014 | Lin | H04N 19/94 358/3.23 |
| 2014/0146998 A1 * | 5/2014 | Wieser | G06K 9/3241 382/103 |
| 2014/0254950 A1 * | 9/2014 | Blurfrushan | G06T 9/00 382/244 |

OTHER PUBLICATIONS

Hung et al. ("Video Super-Resolution Using Codebooks Derived From Key-Frames," IEEE Transactions on Circuits and Systems for Video Technology vol. 22, No. 9, Sep. 2012) (Year: 2012).*

* cited by examiner

*Primary Examiner* — Yubin Hung
(74) *Attorney, Agent, or Firm* — Fox Rothschild LLP

(57) ABSTRACT

Systems and methods for encoding high resolution data associated with a relatively large number of bits to an encoded form having a relatively reduced number of bits. The method includes, by a processor: receiving an input image comprising one or more high resolution objects. The method further includes, for each of the one or more high resolution objects: identifying an object family for that object and determining whether a reference table exists for the object family. If a reference table exists for the object family, the method includes determining a size of that object, and identifying a tag based on the size. The method also includes encoding that object to form an encoded object having a relatively reduced number of bits, associating the identified tag with the encoded object, and saving the encoded object.

40 Claims, 10 Drawing Sheets

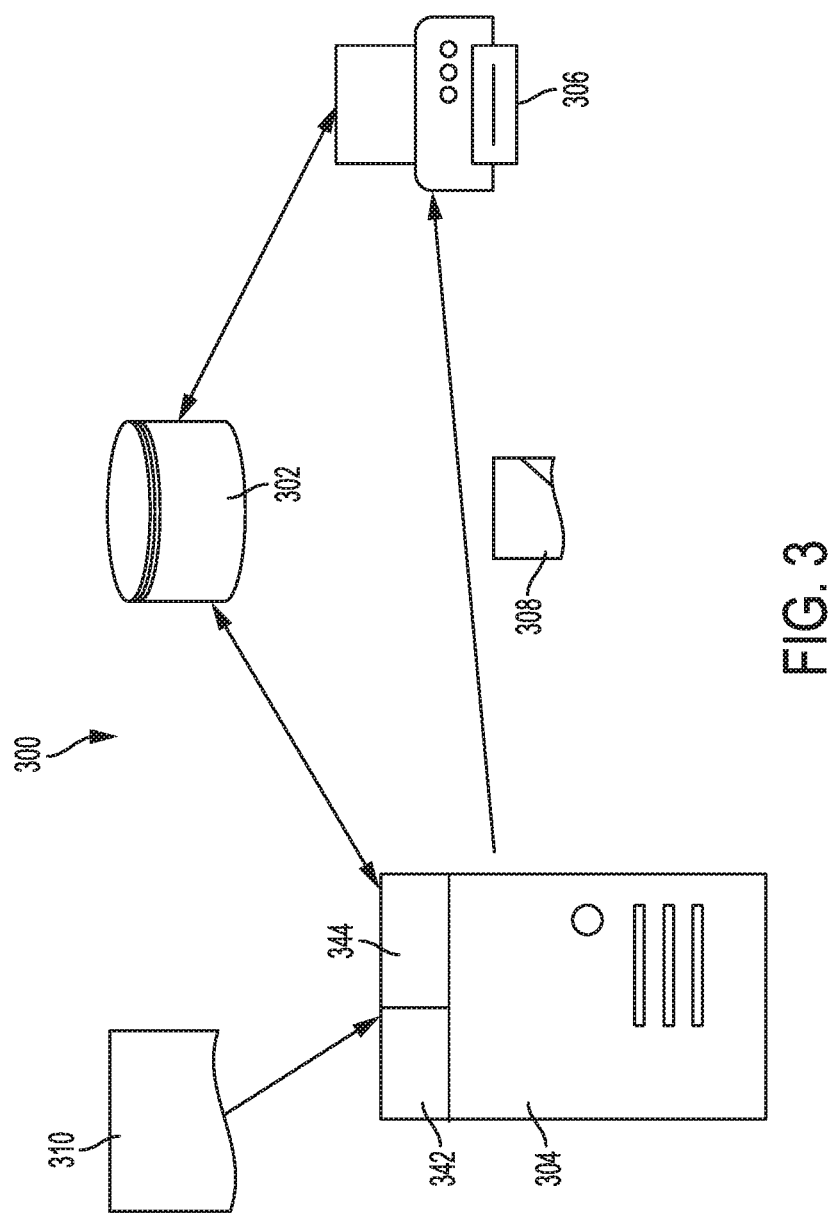

METHODS AND SYSTEMS FOR ENABLING OBJECT ATTRIBUTE DRIVEN SUPER RESOLUTION ENCODING

BACKGROUND

Advancements in the computational power of image processors and the rendering resolution of marking engines have outpaced advancements in data storage and transmission. That is, image processors and image rendering devices or marking engines for achieving a given image quality and image throughput (e.g., pages per minute) are relatively inexpensive when compared to the cost of data storage and transmission components that would be required to support that given image quality and throughput. Nevertheless, it is desirable to achieve the benefits of high speed data processing and high resolution image rendering.

For example, it is desirable to render text and line art, which can include curves and diagonal lines, with high or super resolution, such as, for example, 1200, 2400 or 3600 spots per inch (spi), in order to reduce or avoid perceptible jaggedness in the rendered or printed text or line art. However, a single page of high or super resolution (e.g., 2400 spi) binary or bit map color image data can require up to two gigabytes or more of data storage and/or transmission. Furthermore, in production printing environments, it is common to render over 100 pages per minute. Therefore, the cost of providing storage and communication resources adequate to the task of super resolution data storage and transmission can be quite high.

Super Resolution Encoding (SRE) is one way of achieving high resolution quality text and graphics. High resolution patterns are encoded as gray pixel values at lower resolution and then decoded on the image output terminal (IOT). In order to recover the original high resolution patterns, the gray values need to be preserved. As such, SRE is a rendering mode whereby a set of high resolution binary patterns can be generated from a lower resolution "code" (i.e., the gray pixel values). SRE is not spatially dependent, and allows for a maximum of $2^N$ unique rendering patterns for the associated sub-pixels, where N is the number of bits used to represent the code space. For N=8 bits, there is a total of 256 possible codes (and therefore patterns) that can be specified, each of which will result in a different 4×4 bit pattern to be rendered. Therefore, a single 600×600 dpi 8 bit pixel can specify a 2400×2400 dpi binary rendering pattern. During SRE mode, input data may be associated with one or more tags indicating, for example, that the data is related to text and/or line art, or a portion of an image for which high resolution rendering is desired. Upon receiving a the IOT activates SRE mode for a pixel such that data for that pixel is interpreted as a rendering code by looking up a pattern table including the 256 possible SRE codes.

Traditionally, one set of bit patterns is used for rendering on a per print job and/or on a page basis irrespective of the image content attributes. The current SRE modes lack the ability to render content within the same page by applying different sets of bit patterns (e.g., for low point v. high point data, for Kanji v. English characters, based on line features, etc.). This may result in color distortion, low resolution, or low quality of rendered images.

This document describes a system that may address at least some of the issues described above.

SUMMARY

Methods and systems for encoding high resolution data associated with a relatively large number of bits to an encoded form having a relatively reduced number of bits are disclosed. In an embodiment, the method may include, by a processor receiving an input image comprising one or more high resolution objects. The method may further include, for each of the one or more high resolution objects: identifying an object family for that object and determining whether a reference table exists for the object family, and upon determining that the reference table exists for the object family: determining a size of that object, and identifying a tag, based on the size, using the reference table. The method may also include encoding that object to form an encoded object having a relatively reduced number of bits, associating the identified tag with the encoded object, and saving the encoded object.

In one or more embodiments, the method may include, upon determining that the reference table does not exist for the object family: determining a ratio of a size of a foreground region of that object to a size of a background region of that object, and identifying a tag based on the ratio. Additionally and/or alternatively, the method may include using the ratio to create a reference table for that object.

Optionally, the reference table may include a plurality of object size ranges and corresponding tags for the object size ranges.

In an embodiment, encoding that object may include super resolution encoding (SRE), and the identified tag may be used to determine a set of bit patterns to be used for decoding and rendering the encoded object using SRE.

Optionally, the one or more high resolution objects may be included on a single page corresponding to the input image.

In some embodiments, identifying the object family may include identifying the object family based on one or more characteristics of that object. Examples of the characteristics may include object location in the image, language associated with an object, type of an object, font of an object, style of an object, and/or orientation of an object.

In at least one embodiment, determining the size of that object may include determining the size based on metadata associated with that object. Optionally, determining the size of that object may include determining one or more of the following: point size, pixel height, or pixel width.

In some embodiments, the method may also include transmitting an encoded image to a rendering device, wherein the encoded image includes one or more high resolution objects encoded to form one or more encoded objects having a relatively reduced number of bits. Additionally and/or alternatively, the method may include, by a rendering device: receiving the encoded image, extracting tags associated with each of the one or more encoded objects, using the tags to identify bit patterns for decoding the one or more encoded objects, and decoding the one or more encoded objects using the bit patterns.

BRIEF DESCRIPTION OF THE DRAWINGS

FIG. 3 illustrates an example system for enabling object attribute driven super resolution encoding by associating different sets of bit patterns with different objects, according to an embodiment.

DETAILED DESCRIPTION

Figure 1:
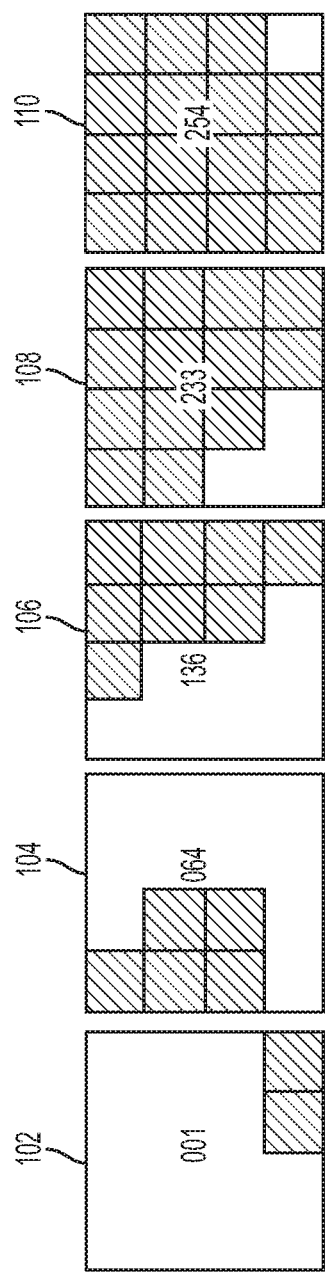
FIG. 1 illustrates a few conventional example bit patterns, such as those that may be found in the prior art.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

The following terms shall have, for purposes of this application, the respective meanings set forth below:

The term "electronic device" or "device" refers to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface. An electronic device also may include one or more communication hardware components such as a transmitter and/or receiver that will enable the device to send and/or receive signals to and/or from other devices, whether via a communications network or via near-field or short-range communication protocols.

As used herein, "image" means any electronic media content that is intended to be used in an electronic form or transmitted to a print device to be printed. It may also include set of instructions or metadata that cause the image to be processed. Examples of electronic image file types may include various digital images, text, and mixed content files, such as PDF, TXT, DOC, TIFF, BMP, GIF, JPEG, and other common page description language (PDL) file and document formats, such as Adobe® Postscript®. The term "image output terminal" (JOT) refers to a device that can receive an item of data defining an image and provide the image as output. A "display" is an image output device that provides the output image in human viewable form. The visible pattern presented by a display is a "displayed image" or simply "image."

An image may include "objects", such as, for example, lines, text characters, graphics, or the like. Each object representation includes two regions: a first region, which can be considered as the foreground region having an object body image shape, and a second region or background region, which constitutes a field area that is suitably sized and arranged for encompassing the object body image shape. The object may be determined to have an object size (S), which can be defined by, for example, a font size, point size, pixel height, a pixel width, etc. as may be considered most appropriate for the composition of the object.

The term "object family" refers to a group of objects that are similar to each other with respect to one or more object characteristics. Examples of such characteristics may include, without limitation, object location in the image, language associated with text objects (such as Japanese (e.g., kanji), English, etc.), type of object (e.g., line, text, graphics, etc.), font for text objects (e.g., font name, font weight, font style, etc.), style for text objects, type of a text object such as a superior letter and an inferior letter, orientation of an object, or the like.

The term "pixel" refers to the smallest addressable element of a raster image in a given system. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

The term "print device" refers to an IOT having hardware capable of reading a digital file corresponding to an image and using the information from the file and associated print instructions to render the image on a substrate in human readable form. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

A "print system" is a system of hardware components that include a print device and other components. For example, a printing system may include a marking engine (i.e., the print hardware or print engine) and a digital front end. A digital front end (DFE) is an integrated print workflow management system, including one or more processing devices, capable of receiving and processing print requests and controlling the operation of a print engine to fulfill the print request. The DFE and print engine may be part of a single device (such as a digital printing press), or separate parts of a system of networked devices.

A "processor" or "processing device" is a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

This document describes a system for associating different sets of bit patterns with different encoded objects of an input image based on the attributes of the objects, and identifying the correct set of bit patterns to use for decoding each object when causing a rendering device to render the image in a human readable format. In an embodiment, the attributes of an object may include, without limitation, object size, object family, and/or ratio of foreground region to background region of the object. The bit pattern sets are typically stored in a memory and accessed by the rendering device when generating the commands to print the document. In this way, different types of objects in a single page can be encoded using the same SRE codes but decoded using different sets of bit patterns during rendering.

Referring now to FIG. 1, it illustrates a few conventional example bit patterns 102, 104, 106, 108, and 110 and their corresponding SRE codes. For 8-bit super-resolution encoding, there are 256 possible SRE/SRD codes, representing different 4×4 bit patterns. As illustrated, each SRE code is associated with a grid that is four bits wide by four bits high, such that there are sixteen bits in each pattern. The grid has one or more bits that are completely filled or not filled at all. In this embodiment, the bits are square shaped and the grid is square shaped. However, it is to be appreciated that the bits can be substantially any shape used to tile a plane, such as rectangles, hexagons, etc. Each pattern has a corresponding SRE code. In one example, bit pattern 110 has fifteen bits in the upper left hand corner that are completely filled wherein the lower right bit is not filled. This example bit pattern is associated with SRE code 254. Similarly, patterns 102, 104, 106, and 108 represent the SRE codes of "001," "064," "136," and "223," respectively. Substantially any pattern can be associated with substantially any SRE code.

Figure 2A:
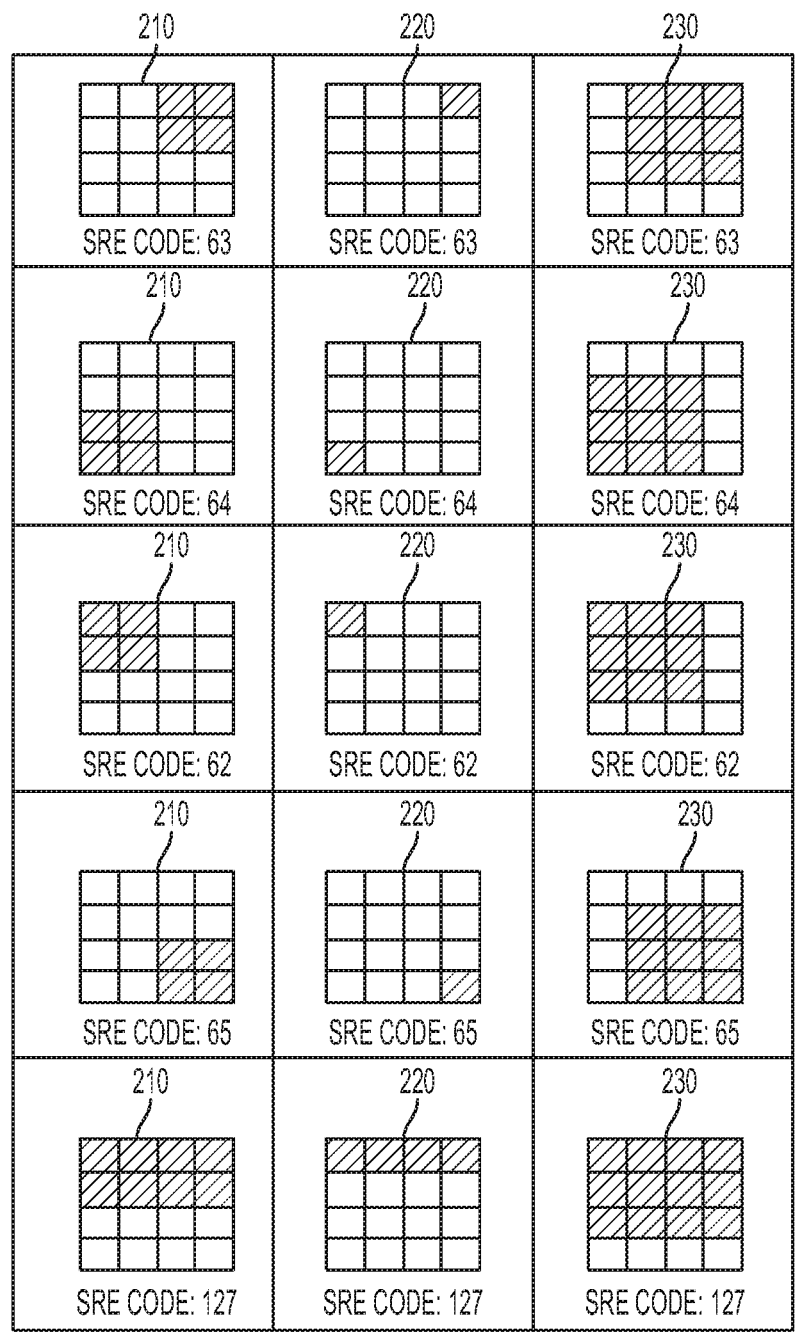
FIGS. 2A-2C illustrate example sets of bit patterns for rendering an object, according to an embodiment.
Figure 2B:
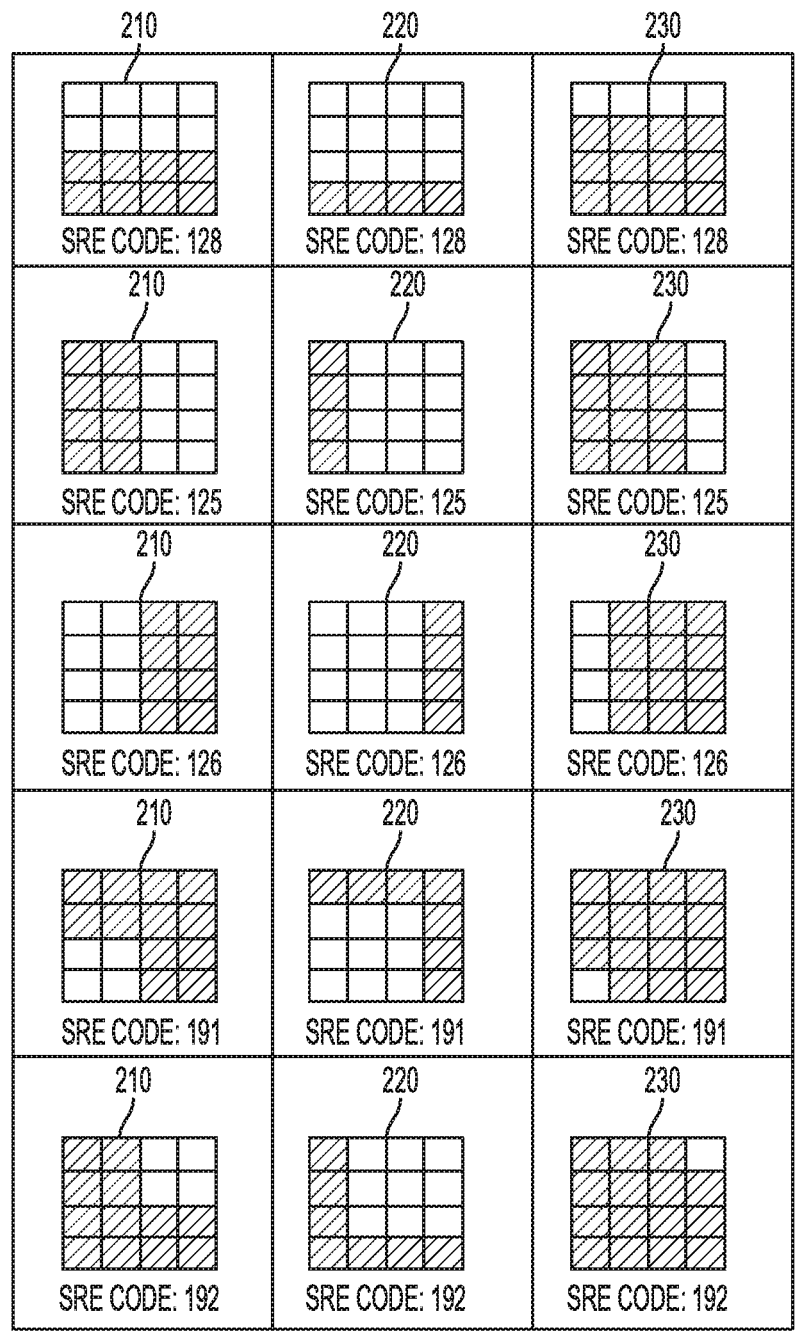
Figure 2C:
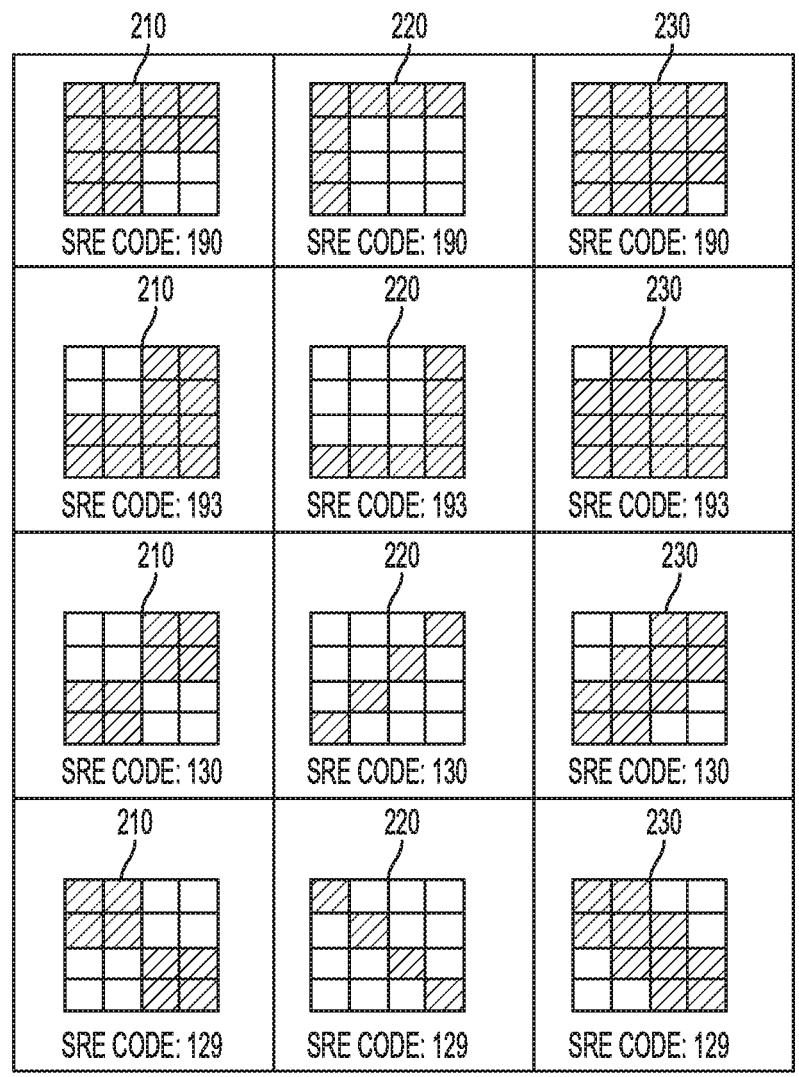

FIGS. 2A-2C illustrate three example sets of bit patterns 210, 220, and 230, that may be used for rendering an object based on the attributes of the object, according to an embodiment. It will be understood to those skilled in the art that any number sets is within the scope of this disclosure. A 256 element look up table is defined to associate each of the patterns in the sets 210, 220, and 230 with an SRE code (0-255). Example SRE codes are shown in FIG. 2. Hence, each SRE code has a corresponding bit pattern in all the sets. In an embodiment, the bit patterns from each set corresponding to the same SRE code may differ from one another to account for different attributes of an object. For example, for sets 210, 220, and 230, the bit patterns from each set corresponding to the same SRE code differ from each other to account for variation in object attributes. The SRE codes can be assigned to a bit pattern based upon the number of bits filled within a particular pattern. For example, SRE code '0' can have zero bits filled, code '45' can have four bits filled, SRE code '132' can have eight bits filled, etc. in a particular configuration.

FIG. 3 illustrates an example of a system for associating different sets of bit patterns with different objects of an input image 310 based on the attributes of the objects (e.g., size, object family, etc.), and identifying the correct set of bit patterns to use for decoding each object when causing a rendering device to render the image in a human readable format. In an embodiment, the system includes an SRE library 302 that stores the different sets of bit patterns and corresponding SRE codes and tags, an electronic device 304 and a rendering device (or image output terminal) 306. The electronic device 304 may be a component, or may include one or more components, of the rendering device 306, or they may be separate devices as shown. The electronic device 304 processes the input image 310 and generates an encoded image file 308 that it sends to the rendering device 306. The electronic device 304 may use the bit patterns and codes stored in the SRE library 302 to generate the encoded image file, and the rendering device 306 may use instructions and parameters (including the SRE codes and tags) in the encoded image file to determine how to render the input image 310 in a human readable format (e.g., printing on a substrate).

In an embodiment, the SRE library 302 may include one or more sets of bit patterns and associated SRE codes as discussed above with respect to FIG. 2. Each of the one or more sets of bit patterns may be associated with a unique tag, and each object of the input image that is encoded using SRE includes a tag that identifies the SRE set to be used by the rendering device for decoding that object. The SRE library 302 may include a lookup table or other means that associates SRE codes with bit patterns in each of the sets. The SRE code may be related to the number and location of bits that are filled within the pattern. An SRE code can provide a more granular resolution than available utilizing conventional means. For instance, utilizing SRE, an eight bit code at six hundred dots per inch (dpi) can represent a sixteen bit pattern at two thousand four hundred dpi.

In an embodiment, the electronic device 304 may include an encoder module 344 comprising programming instructions configured to cause a processor of the electronic device to encode high resolution objects in an input image that are associated with a relatively large number of bits to an encoded form having relatively reduced number of bits using SRE prior to storing or transmitting the objects in association with a rendering process of the rendering device 306. The electronic device 304 may also include an analyzer module 342 comprising programming instructions configured to cause a processor of the electronic device to analyze one or more attributes (e.g., size, object family, ratio of foreground region to background region) of the objects in the input image and associate a tag with each encoded object based on the attributes. For example, for a text string that reads "dollar", different tags may be associated with each character of the string during encoding, and during rendering, a different set of bit patterns may be used to construct the pixels of each character based on the respective tags. During encoding, each character may be represented using one or more SRE codes irrespective of the set of bit patterns to be used during rendering, and a tag identifying the set of bit patterns may be associated with each encoded character. The tag may then be used by the rendering device 306 to identify the set of bit patterns to be used for decoding the encoded character represented using the SRE codes for rendering the characters in high resolution.

In an embodiment, the rendering device 306 is an apparatus or system such as a printer, scanner, fax machine, copy machine, marking engine, display device, etc., and/or a combination thereof (e.g., a multi-function device or MFD). In some embodiments, the rendering device 306 may be implemented with a single rendering function such as printing or displaying and image. In other embodiments, the rendering device 306 can be configured to provide multiple rendering functions such as scanning, faxing, printing and copying. The rendering device 306 may process the encoded image file and translate it into an image composed of individual dots that for output (e.g., print) in a human readable form. The rendering device 306 may be configured to receive an encoded image file including encoded high resolution input image data. The rendering device may then decode each encoded object in the image by identifying the correct set of bit patterns for the SRE codes representing the encoded object by, for example, matching the tag associated with the object.

Figure 4:
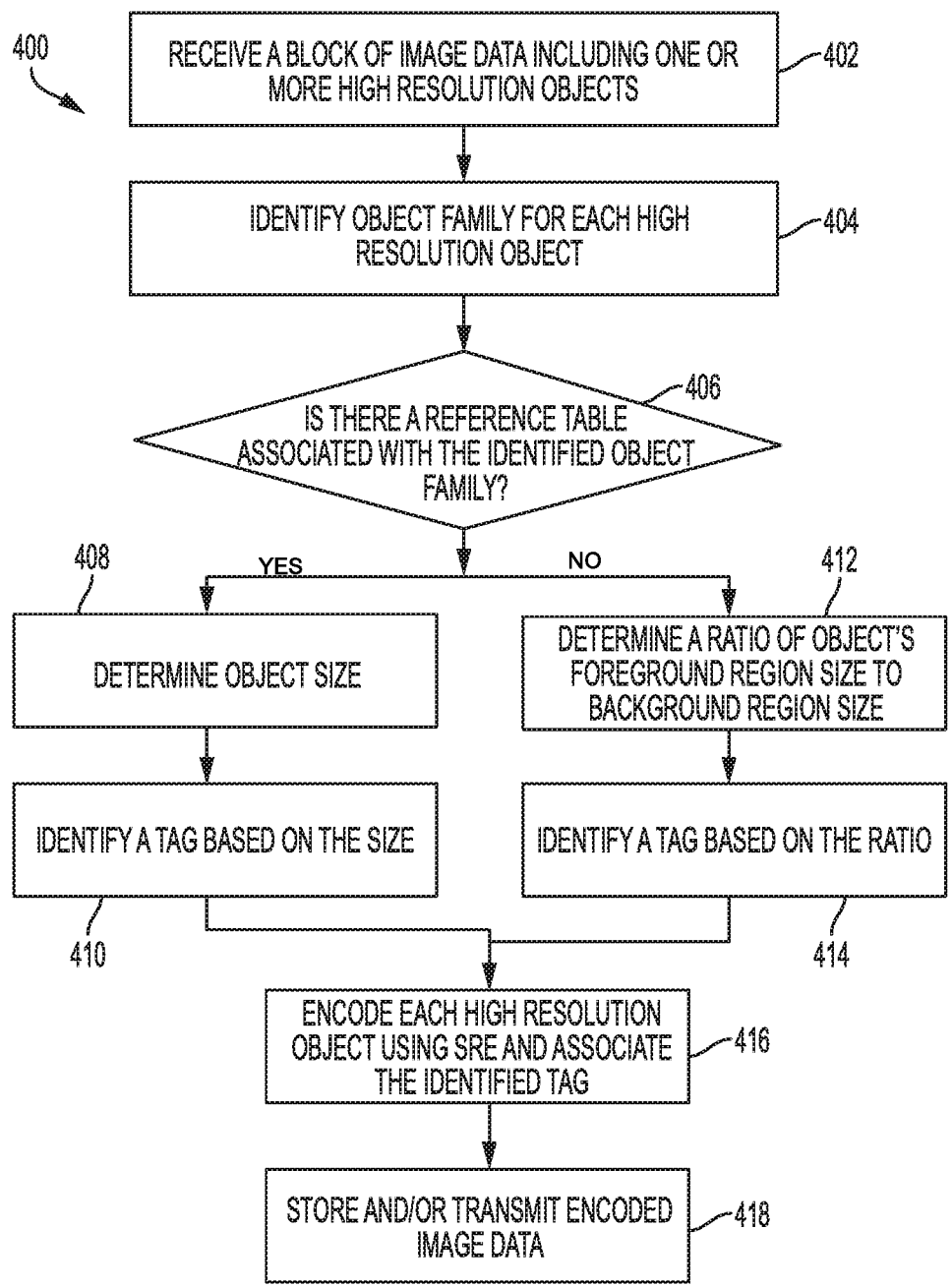
FIG. 4 is a flowchart illustrating an example method for enabling object attribute driven super resolution encoding by associating different sets of bit patterns with different objects, according to an embodiment.

Referring now to FIG. 4, a flowchart illustrating an example method for encoding image data (e.g., using systems disclosed in FIG. 3) is provided. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, or the steps may be performed in the order disclosed or in an alternate order.

At 402, the system may receive a block of image data including one or more high resolution objects associated with a relatively large number of bits that must be encoded to a relatively reduced number of bits for reasonable storage and transmission (encoding). It will be understood to those skilled in the art that high resolution objects can include objects at any resolution for which storage or transmission at a lower resolution is desired. In this regard, the phrase—high input resolution—refers to any resolution higher than the encoded resolution. The input resolution for an object may be the same or different from the resolution at which the object is rendered. The received image data can be a portion of a binary bit map or can include contone, multi-gray level, halftone, or high-addressable data indicating levels of gray or lightness beyond the two levels represented by binary data.

In an embodiment, the system may identify (404) an object family for each of the one or more high resolution objects in the image data. In an embodiment, system may identify the object family based on one or more characteristics of the object. Examples of such characteristics may include, without limitation, object location in the image, language associated with text objects (such as Japanese (e.g., kanji), English, etc.), type of object (e.g., line, text, graphics, etc.), font for text objects (e.g., font name, font weight, font style, etc.), style for text objects, type of a text object such as a superior letter and an inferior letter, orientation of an object, or the like. For example, all text objects that are in English language may belong to a first object family and all text objects that are in Japanese language may belong to a second object family. Alternatively and/or additionally, all text objects that are associated with "Times New Roman" font type may belong to a first object family, all text objects that are associated with "Calibri" font type may belong to a second object family, and all text objects that are associated with "Arial" font type may belong to a third object family. Optionally, all text objects that are associated with "Times New Roman" font type and bold font weight may belong to a first object family, and all text objects that are associated with "Times New Roman" font type and normal font weight may belong to a second object family.

In an embodiment, the object family may be representative of size, resolution, etc. of an object with respect to its attributes. For example, for a same font size, a Japanese character may appear smaller compared to an English character, and hence may belong to different object families.

In an embodiment, the system may identify various characteristics (an/or attributes) of the objects by, for example, analyzing the metadata associated with the object in the page description format, such as PostScript, PDF, PCL, or any other programming language or page description language (PDL) of the received image data.

At 406, the system may, for each of the one or more high resolution objects, determine whether there exists a reference table including a set of object size ranges and corresponding tags associated with its identified object family (e.g., in a look up table or other type of reference database). A tag may be used by a rendering device to identify the correct set of bit patterns to be used for decoding an object. The tag may also indicate to the rendering device, for example, that the data is related to an object of an image for which SRE rendering is desired. Alternatively, one tag may indicate to the rendering device that the data in an image is related to an object of an image for which SRE rendering is desired, and a separate tag may be used to identify the correct set of bit patterns to be used for decoding the data.

For example, an object family may include a threshold size and objects having a size below the reference size may be associated with a tag corresponding to set 210 of FIG. 2 and objects having a size above the reference size may be associated with a tag corresponding to set 220 of FIG. 2. The reference table including the set of object size ranges and corresponding tags may have been predetermined (for example using ratios as discussed below), optimized and/or stored within the system to be referenced for rendering object families. Alternatively, such object size ranges and corresponding tags may be acquired, for example, by receiving a user input.

If for an object, there exists a reference table including the set of object size ranges and corresponding tags associated with the identified object family, the system may determine an object size (408) for that object. The object size of an object may include, without limitation, point size, pixel height, pixel width, or the like. In an embodiment, the system may identify the size of the objects by, for example, analyzing the metadata associated with the object in the page description format, such as PostScript, PDF, PCL, or any other programming language or page description language (PDL) of the received image data. The system may then identify a tag (410) to be associated with that high resolution object in the image data based on its object size.

However, if for an object, a reference table associated with the identified object family do not exist, the system may determine a ratio (412) of the object's foreground region size to object's background region size. In an embodiment, an object representation includes a foreground region having an object body image shape, and a background region, which constitutes a field area that is suitably sized and arranged for encompassing the object body image shape. For example, for a text object, the ratio may be determined based on the number of pixels in the foreground region to the number of pixels in the background region. The system may then identify a tag (414) to be associated with that high resolution object based on the determined ratio. In an embodiment, different ratios (or ranges of ratios) may be associated with different sets of bit patterns and the corresponding tags, irrespective of the object family. The system may also use the ratio to create and save a set of object size ranges and corresponding tags for the object family for future reference.

For example, for the bit patterns shown in FIG. 2, bit patterns of set 220 may be chosen if, for example, the object size or object ratio for the identified object family is below a first threshold, bit patterns of set 210 may be chosen if the object size or object ratio for the identified object family is above the first threshold but below a second threshold, and bit patterns of set 230 may be chosen if the object size or object ratio for the identified object family is above the second threshold.

At 416, the system may encode each of the high resolution objects in the image data using SRE encoding and associate the identified tag with the encoded object. The encoded image data includes a relatively reduced number of bits that represent high resolution data associated with a relatively large number of bits in an encoded form (that can be reasonably stored and communicated). At 418, the system may store the encoded image data and/or transmit it to a rendering device.

Figure 5:
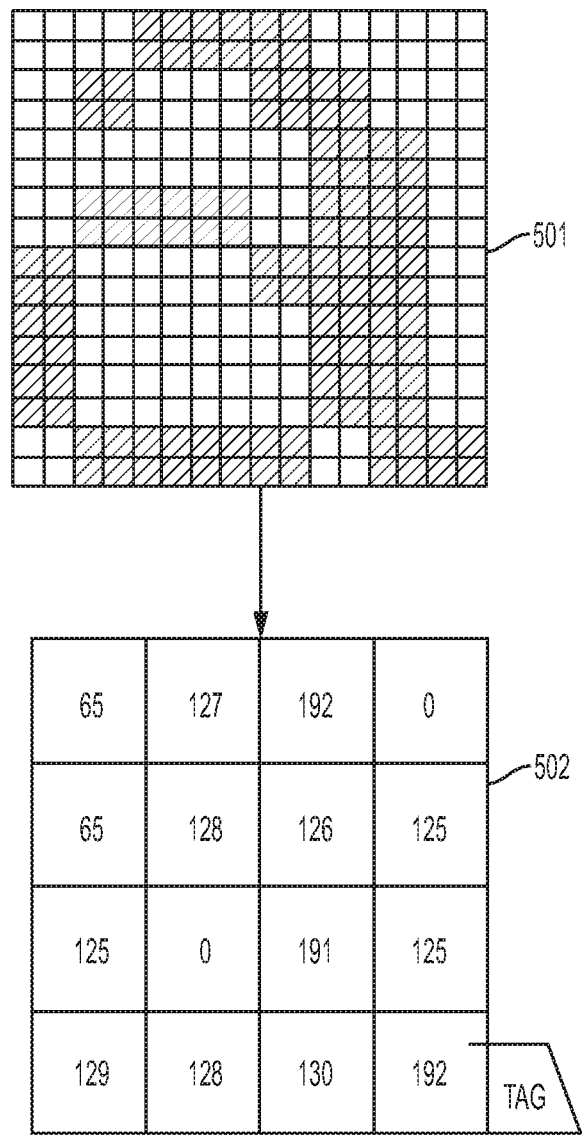
FIG. 5 illustrates an encoded bitmap of character "a", according to an embodiment.

FIG. 5 illustrates an encoded bitmap (502) of character "a" (501) created using the method discussed above.

Figure 6:
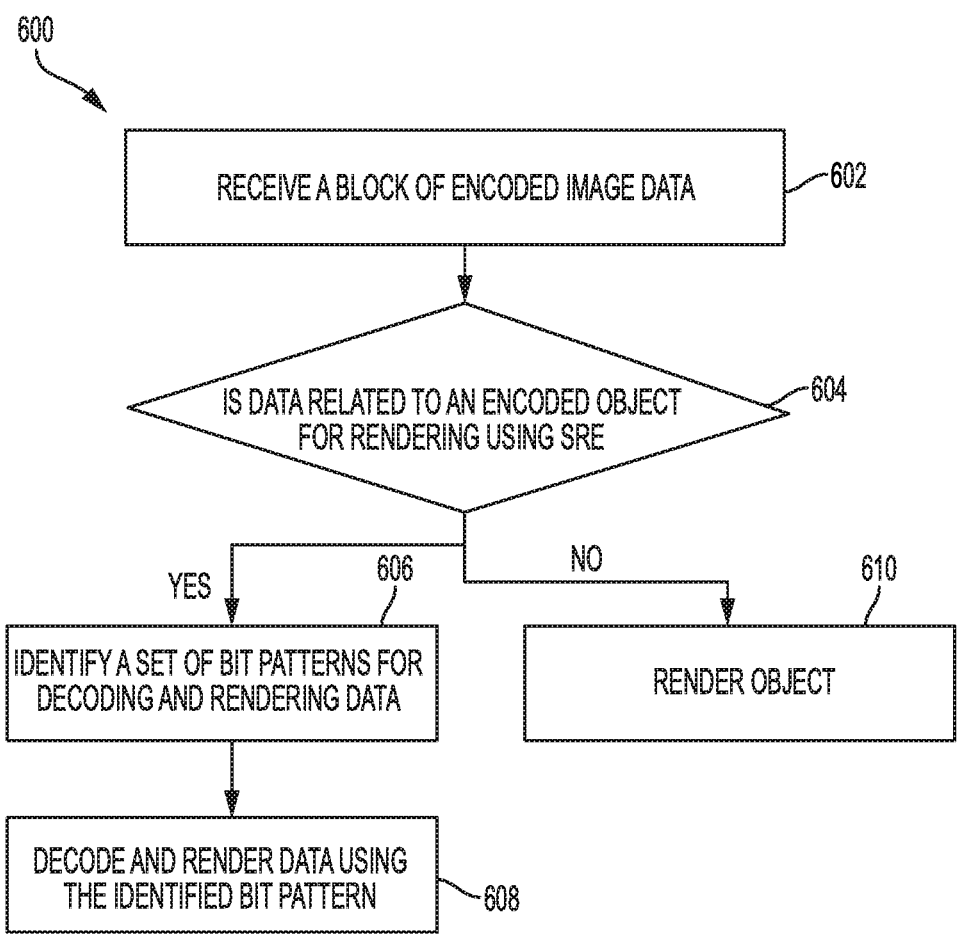
FIG. 6 is a flowchart illustrating an example method for decoding an encoded object for rendering, according to an embodiment.

Referring now to FIG. 6, a flowchart illustrating an example method for decoding and rendering image data is provided. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, or the steps may be performed in the order disclosed or in an alternate order.

At 602, the system (e.g., a rendering device) may receive a block of encoded image data, wherein at least part of the data corresponds to one or more high resolution objects encoded to a relatively reduced number of bits using SRE.

For each data in the received block of encoded image, the system may determine whether the data is related to an encoded object for which high resolution rendering (using SRE) is desired (604). The system may make the determination based on, for example, a tag associated with the data. If it is determined that the data is related to an encoded object for which SRE rendering is desired, the system identify the set of bit patterns to be used for decoding and rendering the data (606). In an embodiment, the system may make the identification by extracting a tag from the encoded data and using the tag to identify the corresponding set of bit patterns.

At 608, the system may decode the data and render it using the identified set of bit patterns.

Figure 7:
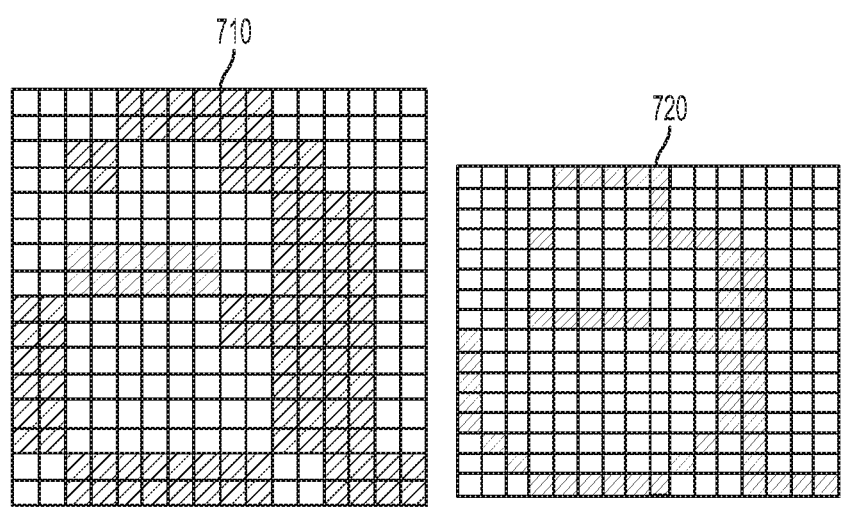
FIG. 7 illustrates images obtained by decoding an encoded bitmap using two different sets of bit patterns, according to an embodiment.

With reference to the example in FIG. 7, an encoded bitmap (700) of character "a" is decoded using two different sets of SRE patterns (210 and 220). The resultant decoded images 710 and 720, respectively, are rendered as different patterns.

It will be understood to those skilled in the art that while the disclosure describes encoding of high resolution data using SRE as an example, other now or hereafter known encoding methods are within the scope of this disclosure and may be used without deviating from the principles described herein.

Figure 8:
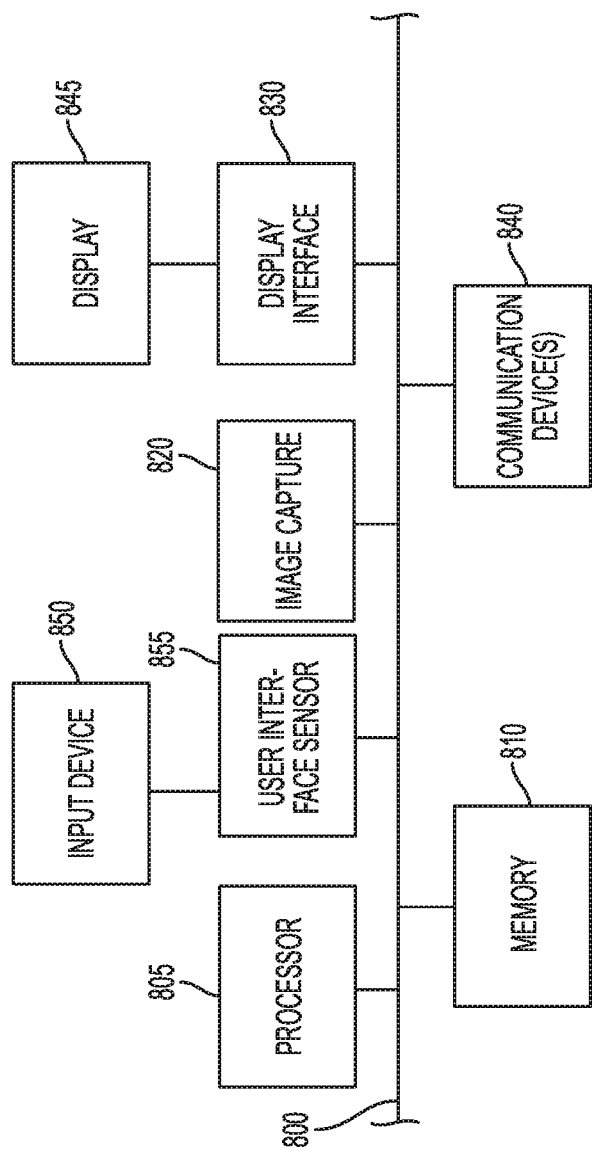
FIG. 8 illustrates a block diagram of example hardware that may be used to contain or implement program instructions according to an embodiment.

FIG. 8 depicts an example of internal hardware that may be included in any of the electronic components of the system, such as the electronic device or the rendering device of FIG. 1. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 810. A memory device may include a single device or a collection of devices across which data and/or instructions are stored.

An optional display interface 830 may permit information from the bus 800 to be displayed on a display device 845 in visual, graphic or alphanumeric format. An audio interface and audio output (such as a speaker) also may be provided. Communication with external devices may occur using various communication devices 840 such as a transmitter, transceiver, antenna, communications port or a similar device. A communication device 840 may be attached to a communications network, such as the Internet, a local area network or a cellular telephone data network.

The hardware may also include a user interface sensor 855 that allows for receipt of data from input devices 850 such as a keyboard, a mouse, a joystick, a touchscreen, a remote control, a pointing device, a video input device and/or an audio input device. Data also may be received from an image capturing device 820, such of that a scanner or camera.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method for encoding high resolution data associated with a relatively large number of bits to an encoded form having a relatively reduced number of bits, the method comprising, by a processor:
   receiving an input image comprising one or more high resolution objects; and
   for each of the one or more high resolution objects:
      identifying an object family for that object,
      determining whether a reference table exists for the object family,
      upon determining that the reference table exists for the object family:
         determining a size of that object, and
         identifying a first tag, based on the size, using the reference table,
      upon determining that the reference table does not exist for the object family:
         determining a ratio of a size of a foreground region of that object to a size of a background region of that object, and
         identifying a second tag based on the ratio,
      encoding that object to form an encoded object having a relatively reduced number of bits,
      associating the first tag or the second tag with the encoded object, and
      saving the encoded object.

2. The method of claim 1, further comprising, using the ratio to create a reference table for that object.

3. The method of claim 1, wherein the reference table comprises a plurality of object size ranges and corresponding tags for the object size ranges.

4. The method of claim 1, wherein:
   encoding that object comprises encoding that object using super resolution encoding (SRE); and
   the identified tag is used to determine a set of bit patterns to be used for decoding and rendering the encoded object using SRE.

5. The method of claim 1, wherein the one or more high resolution objects are included on a single page corresponding to the input image.

6. The method of claim 1, wherein identifying the object family comprises identifying the object family based on one or more characteristics of that object selected from one or more of the following: object location in the image, language associated with an object, type of an object, font of an object, style of an object, or orientation of an object.

7. The method of claim 1, determining the size of that object comprises determining the size based on metadata associated with that object.

8. The method of claim 1, further comprising, transmitting an encoded image to a rendering device, wherein the encoded image comprises one or more high resolution objects encoded to form one or more encoded objects having a relatively reduced number of bits.

9. The method of claim 8, further comprising, by a rendering device:
receiving the encoded image;
extracting tags associated with each of the one or more encoded objects;
using the tags to identify bit patterns for decoding the one or more encoded objects; and
decoding the one or more encoded objects using the bit patterns.

10. The method of claim 1, wherein determining the size of that object comprises determining one or more of the following: point size, pixel height, or pixel width.

11. A system for encoding high resolution data associated with a relatively large number of bits to an encoded form having a relatively reduced number of bits, the system comprising:
a processing device; and
a non-transitory, computer-readable memory containing programming instructions that are configured to cause the processing device to:
receive an input image comprising one or more high resolution objects; and
for each of the one or more high resolution objects:
identify an object family for that object,
determine whether a reference table exists for the object family,
upon determining that the reference table exists for the object family:
determine a size of that object, and
identify a first tag, based on the size, using the reference table,
upon determining that the reference table does not exist for the object family:
determine a ratio of a size of a foreground region of that object to a size of a background region of that object, and
identify a second tag based on the ratio,
encode that object to form an encoded object having a relatively reduced number of bits,
associate the first tag or the second tag with the encoded object, and
save the encoded object.

12. The system of claim 11, further comprising programming instructions that are configured to cause the processing device to use the ratio to create a reference table for that object.

13. The system of claim 11, wherein the reference table comprises a plurality of object size ranges and corresponding tags for the object size ranges.

14. The system of claim 11, wherein:
the programming instructions that cause the processor to encode that object comprise instructions to encode that object using super resolution encoding (SRE); and
the identified tag is used to determine a set of bit patterns to be used for decoding and rendering the encoded object using SRE.

15. The system of claim 11, wherein the one or more high resolution objects are included on a single page corresponding to the input image.

16. The system of claim 11, wherein the programming instructions that cause the processor to identify the object family comprise programming instructions to identify the object family based on one or more characteristics of that object selected from one or more of the following: object location in the image, language associated with an object, type of an object, font of an object, style of an object, or orientation of an object.

17. The system of claim 11, the programming instructions that cause the processor to determine the size of that object comprise programming instructions to determine the size based on metadata associated with that object.

18. The system of claim 11, further comprising programming instructions that are configured to cause the processing device to transmit an encoded image to a rendering device, wherein the encoded image comprises one or more high resolution objects encoded to form one or more encoded objects having a relatively reduced number of bits.

19. The system of claim 18, further comprising programming instructions that are configured to cause the processing device to cause the rendering device to:
receive the encoded image;
extract tags associated with each of the one or more encoded objects;
use the tags to identify bit patterns for decoding the one or more encoded objects; and
decode the one or more encoded objects using the bit patterns.

20. The system of claim 11, wherein the programming instructions that cause the processing device to determine the size of that object comprise programming instructions to determine one or more of the following: point size, pixel height, or pixel width.

21. A method for encoding high resolution data associated with a relatively large number of bits to an encoded form having a relatively reduced number of bits, the method comprising, by a processor:
receiving an input image comprising one or more high resolution objects; and
for each of the one or more high resolution objects:
identifying an object family for that object,
determining whether a reference table exists for the object family, wherein the reference table comprises a plurality of object size ranges and corresponding tags for the object size ranges,
upon determining that the reference table exists for the object family:
determining a size of that object, and
identifying a tag, based on the size, using the reference table,
encoding that object to form an encoded object having a relatively reduced number of bits,
associating the identified tag with the encoded object, and
saving the encoded object.

22. The method of claim 21, further comprising:
determining a ratio of a size of a foreground region of that object to a size of a background region of that object, and
using the ratio to create the reference table for that object.

23. The method of claim 21, further comprising, using the ratio to create a reference table for that object.

24. The method of claim 21, wherein:
encoding that object comprises encoding that object using super resolution encoding (SRE); and
the identified tag is used to determine a set of bit patterns to be used for decoding and rendering the encoded object using SRE.

25. The method of claim 21, wherein the one or more high resolution objects are included on a single page corresponding to the input image.

26. The method of claim 21, wherein identifying the object family comprises identifying the object family based on one or more characteristics of that object selected from one or more of the following: object location in the image, language associated with an object, type of an object, font of an object, style of an object, or orientation of an object.

27. The method of claim 21, determining the size of that object comprises determining the size based on metadata associated with that object.

28. The method of claim 21, further comprising, transmitting an encoded image to a rendering device, wherein the encoded image comprises one or more high resolution objects encoded to form one or more encoded objects having a relatively reduced number of bits.

29. The method of claim 28, further comprising, by a rendering device:
receiving the encoded image;
extracting tags associated with each of the one or more encoded objects;
using the tags to identify bit patterns for decoding the one or more encoded objects; and
decoding the one or more encoded objects using the bit patterns.

30. The method of claim 21, wherein determining the size of that object comprises determining one or more of the following: point size, pixel height, or pixel width.

31. A system for encoding high resolution data associated with a relatively large number of bits to an encoded form having a relatively reduced number of bits, the system comprising:
a processing device; and
a non-transitory, computer-readable memory containing programming instructions that are configured to cause the processing device to:
receive an input image comprising one or more high resolution objects; and
for each of the one or more high resolution objects:
identify an object family for that object,
determine whether a reference table exists for the object family, wherein the reference table comprises a plurality of object size ranges and corresponding tags for the object size ranges,
upon determining that the reference table exists for the object family:
determine a size of that object, and
identify a tag, based on the size, using the reference table,
encode that object to form an encoded object having a relatively reduced number of bits,
associate the identified tag with the encoded object, and
save the encoded object.

32. The system of claim 31, further comprising programming instructions that are configured to cause the processing device to:
determine a ratio of a size of a foreground region of that object to a size of a background region of that object; and
use the ratio to create the reference table for that object.

33. The system of claim 31, further comprising programming instructions that are configured to cause the processing device to use the ratio to create a reference table for that object.

34. The system of claim 31, wherein:
the programming instructions that cause the processor to encode that object comprise instructions to encode that object using super resolution encoding (SRE); and
the identified tag is used to determine a set of bit patterns to be used for decoding and rendering the encoded object using SRE.

35. The system of claim 31, wherein the one or more high resolution objects are included on a single page corresponding to the input image.

36. The system of claim 31, wherein the programming instructions that cause the processor to identify the object family comprise programming instructions to identify the object family based on one or more characteristics of that object selected from one or more of the following: object location in the image, language associated with an object, type of an object, font of an object, style of an object, or orientation of an object.

37. The system of claim 31, the programming instructions that cause the processor to determine the size of that object comprise programming instructions to determine the size based on metadata associated with that object.

38. The system of claim 31, further comprising programming instructions that are configured to cause the processing device to transmit an encoded image to a rendering device, wherein the encoded image comprises one or more high resolution objects encoded to form one or more encoded objects having a relatively reduced number of bits.

39. The system of claim 38, further comprising programming instructions that are configured to cause the processing device to cause the rendering device to:
receive the encoded image;
extract tags associated with each of the one or more encoded objects;
use the tags to identify bit patterns for decoding the one or more encoded objects; and
decode the one or more encoded objects using the bit patterns.

40. The system of claim 31, wherein the programming instructions that cause the processing device to determine the size of that object comprise programming instructions to determine one or more of the following: point size, pixel height, or pixel width.

* * * * *